United States Patent
Chong et al.

(12) 
(10) Patent No.: US 10,630,870 B2
(45) Date of Patent: Apr. 21, 2020

(54) SYSTEM AND METHOD FOR AUGMENTED REALITY MOVIE SCREENINGS

(71) Applicant: GDC Technology (Shenzhen) Limited, Shenzhen (CN)

(72) Inventors: Man Nang Chong, North Point (HK); Pranay Kumar, North Point (HK)

(73) Assignee: GDC TECHNOLOGY (SHENZHEN) LIMITED, Shenzhen (CN)

( * ) Notice: Subject to any disclaimer, the term of this patent is extended or adjusted under 35 U.S.C. 154(b) by 0 days.

(21) Appl. No.: 16/013,730

(22) Filed: Jun. 20, 2018

(65) Prior Publication Data
US 2019/0394362 A1    Dec. 26, 2019

(51) Int. Cl.
*H04N 5/222* (2006.01)
*G06T 19/00* (2011.01)
*H04N 21/434* (2011.01)
*H04N 21/414* (2011.01)

(52) U.S. Cl.
CPC ......... *H04N 5/2222* (2013.01); *G06T 19/006* (2013.01); *H04N 21/41415* (2013.01); *H04N 21/434* (2013.01)

(58) Field of Classification Search
CPC ........... H04N 5/2222; H04N 21/41415; H04N 21/434; G06T 19/006
See application file for complete search history.

(56) References Cited

U.S. PATENT DOCUMENTS

| 2,475,641 | A | * | 7/1949 | Rosenberg | ............... H04B 5/00 248/156 |
| 2002/0135739 | A1 | | 9/2002 | Standard | |
| 2011/0285854 | A1 | | 11/2011 | Laduke | |
| 2012/0218297 | A1 | * | 8/2012 | Ur | ............................ G09G 5/00 345/633 |
| 2014/0133683 | A1 | * | 5/2014 | Robinson | ............... H04S 3/008 381/303 |
| 2015/0348326 | A1 | * | 12/2015 | Sanders | ............... G06T 19/006 345/633 |
| 2016/0154170 | A1 | * | 6/2016 | Thompson | ........ G02F 1/133603 362/609 |
| 2018/0136828 | A1 | * | 5/2018 | Threewits | ........... G06F 3/04845 |

FOREIGN PATENT DOCUMENTS

| CN | 101893886 A | 11/2010 |
| CN | 101916095 A | 12/2010 |
| CN | 104613957 A | 5/2015 |

OTHER PUBLICATIONS

International Search Report dated Dec. 27, 2019, for PCT Application No. PCT/162019/055232, filed Jun. 20, 2019, five pages.

* cited by examiner

*Primary Examiner* — Michael E Teitelbaum
(74) *Attorney, Agent, or Firm* — Morrison & Foerster LLP (57) ABSTRACT

A method for an augmented reality screening is disclosed. The method includes receiving a content package, such as a Digital Cinema Package (DCP), extracting actor, video, and audio data from the content package, displaying the extracted video data on a display, playing the extracted audio data on one or more speakers, and instructing one or more actors to perform one or more actions on a stage based on the extracted actor data.

10 Claims, 9 Drawing Sheets

| 502 Timestamp | 504 Actor ID | 506 Action |
|---|---|---|
| 00:00:00 | A | Kneel at (2,4) |
| 00:00:00 | B | Stand at (3,6) facing audience |
| 00:02:00 | A | Crawl to (2,5) |
| 00:04:00 | B | Run to (3,3) |
| 00:05:30 | B | Walk to (1,4) |
| ⋮ | ⋮ | ⋮ |
| 02:23:30 | A | Walk to (1,5) |
| 02:24:00 | B | Hug actor at (1,5) |
| 02:24:00 | A | Hug actor at (1,4) |

FIG. 5

| | 602 Timestamp | 604 Actor ID | 606 X-position | 608 Y-position |
|---|---|---|---|---|
| 610A | 00:00:00 | A | 2 | 4 |
| 610B | 00:00:00 | B | 3 | 6 |
| 610C | 00:02:00 | A | 2 | 5 |
| 610D | 00:04:00 | B | 3 | 3 |
| 610E | 00:05:30 | B | 1 | 4 |
| | ⋮ | ⋮ | ⋮ | ⋮ |
| 610Z | 02:23:30 | A | 1 | 5 |

FIG. 6A

| Timestamp | X-position | Y-position |
|---|---|---|
| 00:00:00 | 2 | 4 |
| 00:00:01 | 2 | 4 |
| 00:00:02 | 2 | 4 |
| 00:00:03 | 2 | 4 |
| ⋮ | ⋮ | ⋮ |
| 00:01:59 | 2 | 4 |
| 00:02:00 | 2 | 5 |
| 00:02:01 | 2 | 5 |
| 00:02:02 | 2 | 5 |
| ⋮ | ⋮ | ⋮ |

SYSTEM AND METHOD FOR AUGMENTED REALITY MOVIE SCREENINGS

FIELD OF THE DISCLOSURE

This relates generally to augmented reality movie screenings at cinema theaters.

BACKGROUND OF THE DISCLOSURE

Augmented reality (AR) combines graphics, sounds, smells, haptic feedback, etc. to a real world environment. AR is increasingly becoming more popular and many cinema theaters have begun incorporating AR features in some screenings. For example, some theaters have introduced motion capabilities to cinema theater chairs (e.g., haptic feedback), smells, smoke, and fog to enhance a movie screening experience. However, these features are cinema theater specific that can differ from a movie director's vision. Furthermore, traditional cinema theater systems do not allow live action sequences performed by actors to be combined with a movie screening. For example, actors cannot perform live action sequences in front of a projection screen because their presence would block light from the projector and interfere with the projected images on the screen. Moreover, traditional projectors require a cinema theater to be very dark, which can make it difficult for the audience to see live actors and/or for the live actors to perform during a movie screening. Additionally, live actors may not be skillful enough to properly position themselves during a movie screening, which can degrade the audience experience—particularly for 3D movie screenings where audience perception would be poor if actors are positioned incorrectly. Therefore, a solution for implementing augmented reality movie screenings at cinema theaters with human actors can be desirable—particularly, a solution that can implement AR features consistent with a movie director's vision and is compliant with Digital Cinema Initiatives, LLC (DCI) standards.

SUMMARY OF THE DISCLOSURE

Examples of the disclosure are directed to implementing augmented reality movie screenings at cinema theaters to enhance the viewer experience. A system in accordance with a preferred embodiment of the present invention enables actors to enhance a movie screening at a cinema theater by performing live action sequences on a stage in front of emissive display during the movie screening. For example, the system allows actor position data to be embedded into movie packages distributed to cinema theaters, to extract this actor position data, and to transmit the extracted actor position data to one or more actors during a movie screening on a emissive display at a cinema theater. In accordance with one embodiment, the extracted actor position data is transmitted to one or more devices that activate and deactivate one or more light sources configured under designated locations of the stage. In some embodiments, the one or more light sources under the stage optionally illuminate several different colors with each of the one or more actors having his or her own designated color. In this way, an actor can move about the stage following the locations that are illuminating his or her designated color during a movie screening. In accordance with one embodiment, the extracted actor position data is transmitted to in-ear devices worn by the actors that communicate the live action sequence that the actor should perform during the movie screening. In some examples, a system in accordance with the disclosure can be used to enhance other types of media content screened at a cinema theater. For example, a system in accordance with the disclosure can be used to enhance a screening of television programs (e.g., one or more episodes of a content series), pre-recorded events (e.g., a boxing event, mixed martial arts event, wrestling event, concert, etc.), or any other content that can be screened at a cinema theater. In this way, the system can allow actors to perform live action sequences during screenings at cinema theaters.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples.

Figure 1:
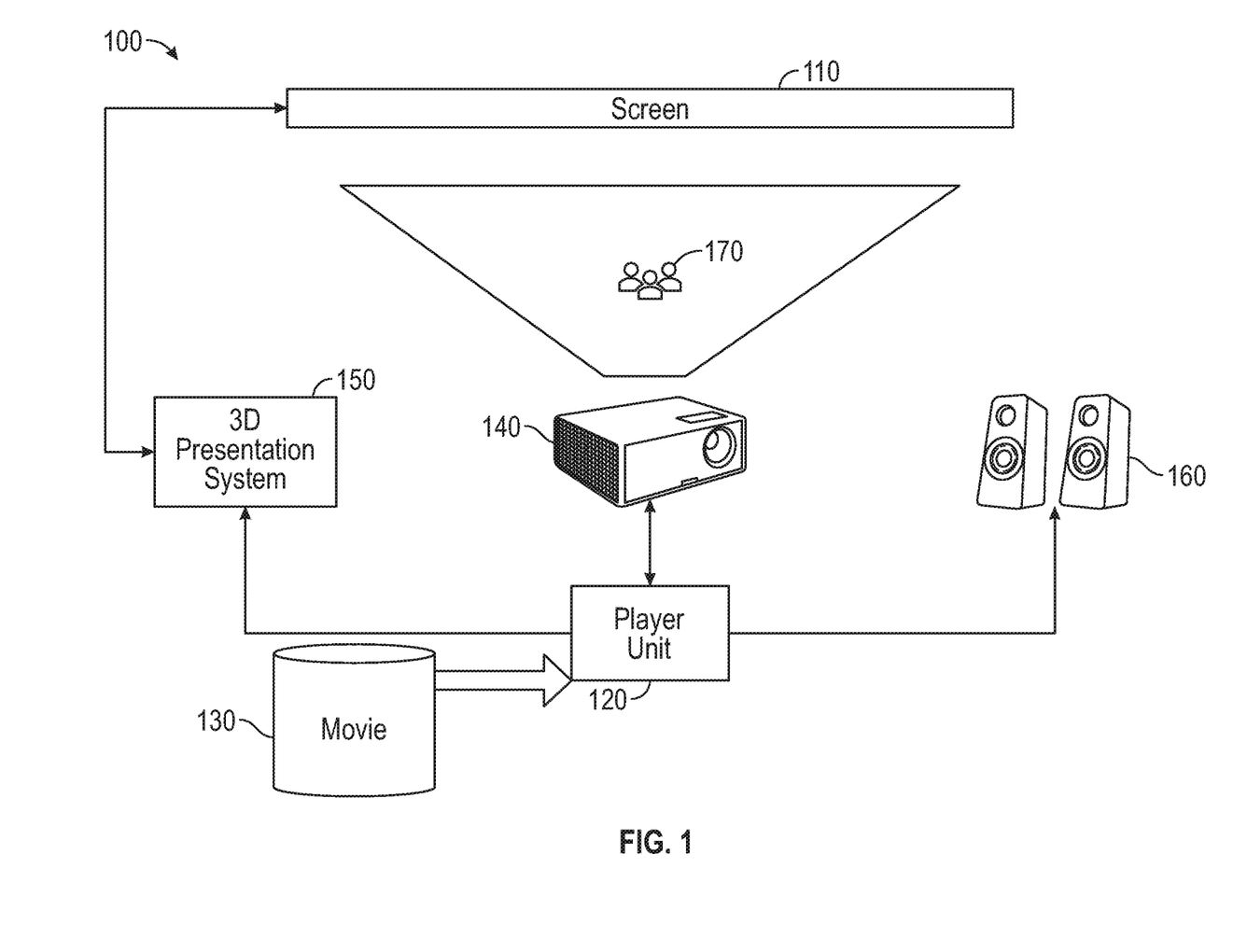
FIG. 1 illustrates a cinema theater system according to examples of the disclosure.

FIG. 1 illustrates a cinema theater system 100 according to examples of the disclosure. As illustrated, the cinema theater system can include, for example, projection screen 110, player unit 120 which can extract digital cinema audio, video, subtitle, and other data streams from a movie package 130 (e.g., Digital Cinema Package (DCP) or other package compliant with any Society of Motion Picture and Television Engineers (SMPTE) standards and/or any DCI specification), projector 140 which can project images/video on screen 110 (e.g., project the video stream received from player unit 120 on screen 110), 3D presentation system 150 which can present 3D images on screen 110 (e.g., a double or triple flash system that projects left and right eye images), and speakers 160 which can play the audio stream(s) received from the player unit 120. FIG. 1 also illustrates audience 170. In some embodiments, digital cinema audio, video, and other data streams from a movie package 130 are the same length (e.g., duration) such that they can be easily synchronized by player unit 120 during a movie screening. In some embodiments, player unit 120 is a server that hosts and screens movies on one or more screens. For example, movie 130 can be stored on a hard drive and inserted and/or uploaded to player unit 120. In this way, player unit 120 can screen movie 130 and other movies on multiple cinema screens. In some embodiments, player unit 120 can receive encrypted DCP content and use a Key Delivery Message (KDM) in order to decrypt the DCP for movie playback. In some embodiments, player unit 120, projector 140, and/or 3D presentation system 150 are combined into one device.

For example, player unit 120 can be a projector with 3D projection capabilities. In some embodiments, speakers 160 can be arranged throughout the cinema theater (e.g., on the walls, ceiling, floor, and/or behind the screen 110).

Figure 2:
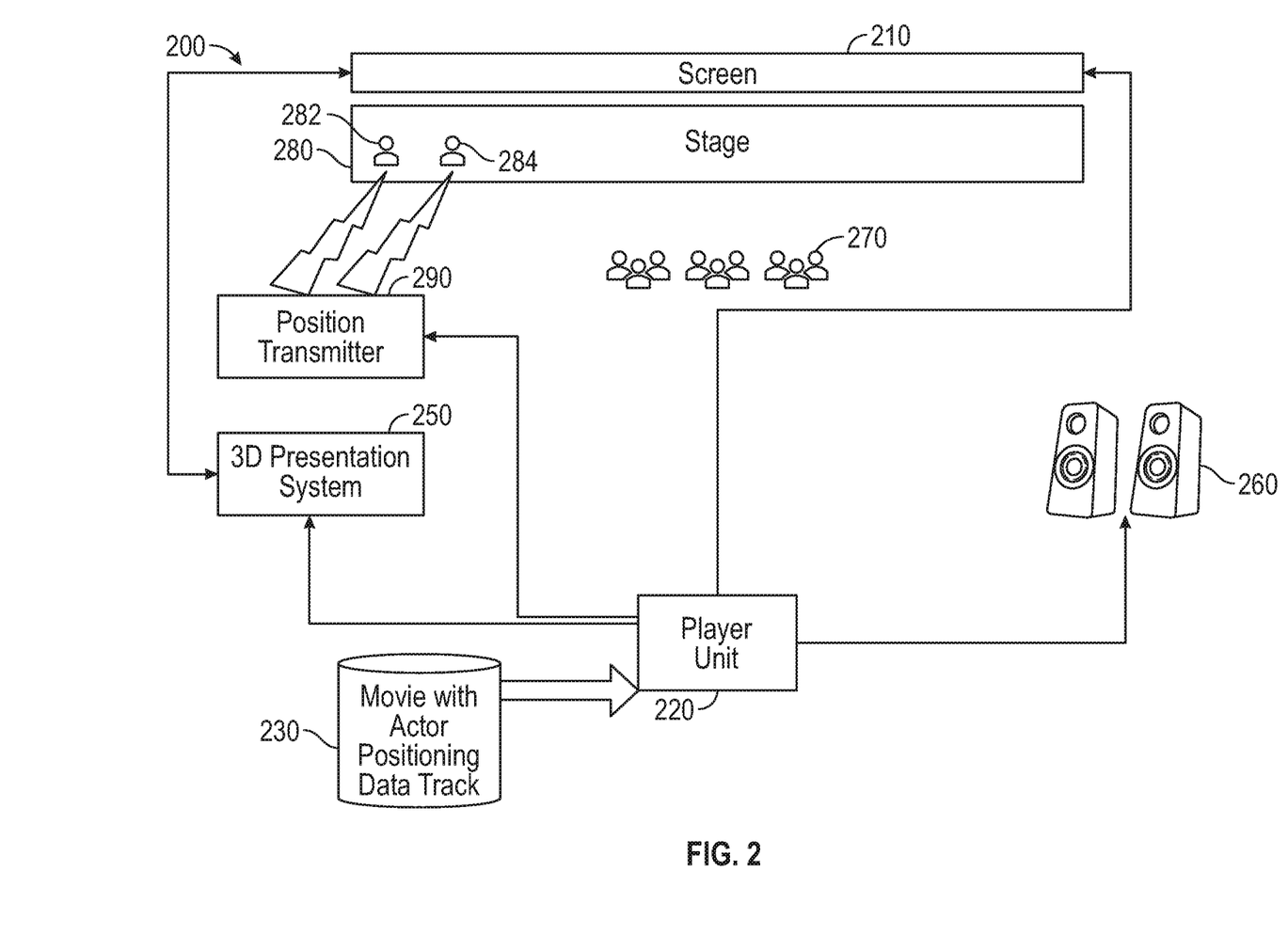
FIG. 2 illustrates a cinema theater system according to examples of the disclosure.

FIG. 2 illustrates a cinema theater system 200 according to examples of the disclosure. As illustrated, the cinema theater system can include, screen 210, player unit 220 which can extract digital cinema audio, video, subtitle, actor positional/action data, and other data streams from a movie package 230 (e.g., DCP or other DCI standard), 3D presentation system 250 which can present 3D images on screen 210, speakers 260 which can play the audio stream(s) received from the player unit 220, stage 280 on which actors 282 and 284 can perform live action sequences during a movie screening, and position transmitter 290 which can transmit actor position information to actors 282 and 284 during a movie screening (e.g., as described below with reference to FIGS. 4-6). FIG. 2 also illustrates audience 270. In the preferred embodiment, movie package 230 includes one or more actor positional and/or action data streams (e.g., as described below with reference to FIGS. 4-6). In some embodiments, digital cinema audio, video, subtitle, actor positional/action data, and other data streams from a movie package 230 are the same length (e.g., duration) such that they can be easily synchronized by player unit 220 during a movie screening. In the preferred embodiment, screen 210 is an emissive display (e.g., an LED, OLED, and plasma displays) that generates its own light without the need of a projector. In some embodiments, screen 210 is a transmissive or transflective display (e.g., an LCD display) that utilizes a backlight without the need of a projector. Utilizing an emissive, transmissive, or transflective display during a movie screening allows actors 282 and 284 to be positioned on stage 280 without distorting images on the screen by blocking light emitting from a projector during the screening. In some embodiments, stage 280 can represent two or more stages either connected or separated by some distance (e.g., one or more inches, feet). In some embodiments, additional stages can be positioned in the cinema theater (e.g., along the sides or the back of the cinema theater or at one or more locations within the audience 270). In some embodiments, actor 282 and/or actor 284 can represent one or more animals (e.g., live or robotic animals) and/or props (e.g., a light pole, telephone booth, vehicle, tree, fence, wall, etc.). It should be understood that while FIG. 2 only illustrates two actors, a system in accordance to the disclosure can be used with fewer or more actors. In some embodiments, player unit 220 can receive encrypted DCP content and use a playback authorization file (e.g., a Key Delivery Message (KDM) or other file with any necessary encryption keys) in order to decrypt the DCP for movie playback. In some embodiments, player unit 220 and 3D presentation system 250 are combined into one device (e.g., as described above with reference to FIG. 1). In some embodiments, speakers 260 can be arranged throughout the cinema theater (e.g., as described above with reference to FIG. 1).

Figure 3:
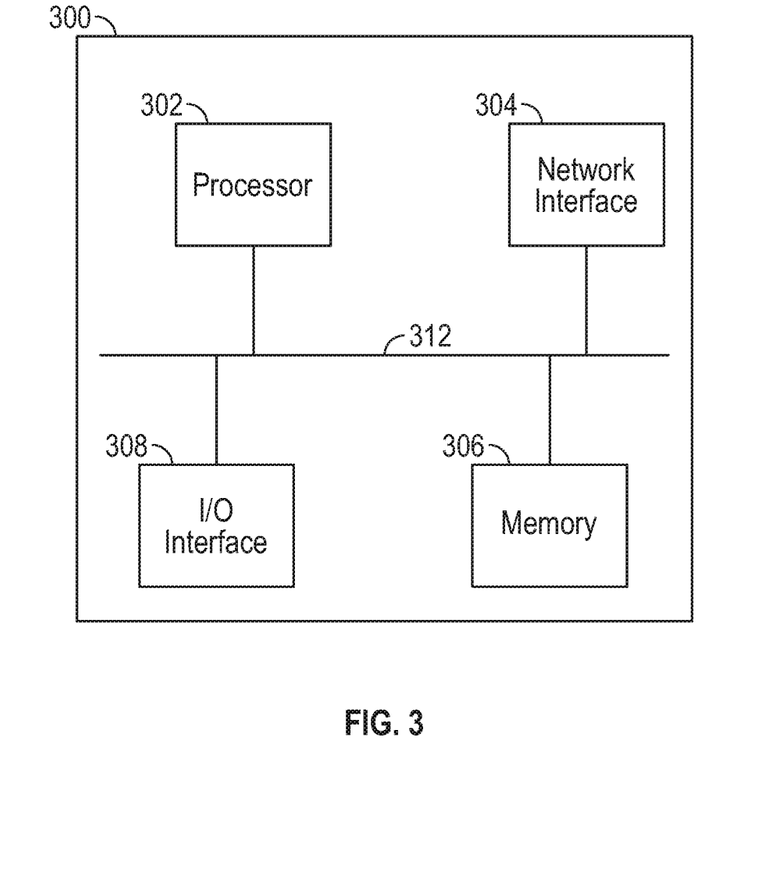
FIG. 3 illustrates a block diagram of a multifunction device according to examples of the disclosure.

FIG. 3 illustrates a block diagram of a multifunction device 300 according to examples of the disclosure. As illustrated, device 300 can include processor 302 (e.g., a central processing unit (CPU)), network interface 304, memory 306, and input/output (I/O) interface 308, all of which can be connected to each other via a system bus 312. Processor 302 can perform any of the methods described with references to FIGS. 1-2 and 4-7, including any encryption and/or decryption processes. Additionally, network interface 304 can perform any of the transmissions (e.g., internet transmissions, radio transmissions) or communications (e.g., internet communications, email, text, and phone calls) described with reference to FIGS. 1-2 and 4-6. Moreover, memory 406 can store data and instructions for performing any or all of the methods described with references to FIGS. 1-2 and 4-6. Memory 306 can be any non-transitory computer-readable storage medium, such as a solid-state drive or a hard disk drive, among other possibilities. Further, I/O interface 308 can interact with any I/O components contained within and/or attached to device 300, including, but limited to, one or more of light sources, display, keyboard, keypad, touch screen, speaker, and microphone. For example, I/O interface 308 can be connected to one or more light sources configured under a stage (e.g., in a positional grid) and can control when and how (e.g., color, brightness, etc.) those one or more light sources are illuminated (e.g., as described below with reference to FIGS. 4B-4D. 6A-6B, and 7).

Multifunction device 300 optionally implements player unit 220, 3D presentation system 250, and/or position transmitter 290 (e.g., as described above with reference to FIG. 2). For example, in one embodiment, multifunction device 300 can implement the position transmitter 290 and purely serve as an I/O interface unit to player unit 220 that is coupled to the one or more of light sources configured under the stage. The player unit 220, which is optionally also implemented by the multifunction device 300 architecture (e.g., as a separate unit or server), can decrypt positional data and play it in sync with the other movie tracks of a DCP to the position transmitter 290 which in turn controls the light sources as directed by the positional data provided by the player unit 220 (e.g., as described with reference to FIGS. 1-2, and 4A-4D).

FIGS. 4A-4D illustrate screen 410 and stage 480 according to examples of the disclosure. Screen 410 is optionally an emissive, transmissive, or transflective display (e.g., an LED, OLED, plasma, or LCD display as described above with reference to FIG. 2). These types of displays do not require a projector and, thus, allow actors to perform live action sequences in front of screen 310 without distorting images on the screen by blocking light emitting from a projector during the screening (e.g., as described above with reference to FIG. 2). These types of display are also brighter than traditional cinema projectors which allow for lights in the cinema theater to optionally remain on, which can make the actors, stage, and/or props more visible to the audience and/or other actors during a screening.

Figure 4A:
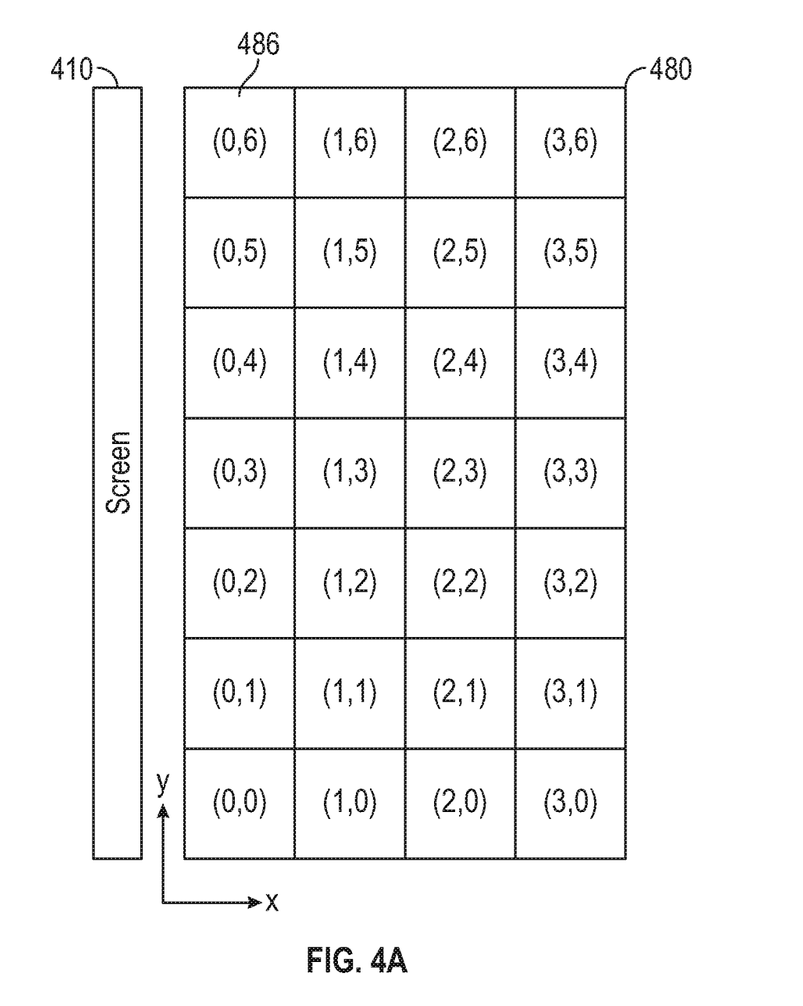
FIGS. 4A-4D illustrate a screen and a stage according to examples of the disclosure.

FIG. 4A illustrates stage 480 according to examples of the disclosure. In the preferred embodiment, a positional grid of a plurality of locations 486 is marked on stage 480. Each of locations 486 identify a potential location for an actor, animal, and/or prop to be located or move about during a screening (e.g., as described above with reference to FIG. 2). For example, each of locations 486 is marked with an indication (e.g., an address or other identifier) of the location, as illustrated in FIG. 4A. In some embodiments, the indication (e.g., address) of each of locations 486 is the X and Y coordinates of that location originating from a reference point on stage 480 (e.g., a corner of stage 480), as illustrated in FIG. 4A or from any other reference point within the cinema theater. It should be understood what while FIG. 4A shows a rectangular stage 480 with twenty-eight distinct locations, stage 480 can be any size, can have any geometric shape, and can contain fewer or more distinct locations (e.g., fewer or more than twenty-eight distinct locations). In some embodiments, more than one stage can be used.

During a movie screening, one or more actors can move about stage 480 from one marked location to another marked location and/or perform action sequences according to positional data associated with the movie screening. In one embodiment, action data stream is extracted from a movie package (e.g., by player unit 220 as described above with reference to FIG. 2), synchronized to the movie screening (e.g., to the video and audio streams by player unit 220 as described above with reference to FIG. 2) and transmitted to one or more actors during a movie screening (e.g., by position transmitter 290 as described above with reference to FIG. 2). In some embodiments, the action data stream can be transmitted to one or more in-ear device(s) worn by the actor(s) during the movie screening. In some embodiments, each actor can have a separate action data stream and each action data stream can be linked to a distinct in-ear device (e.g., by position transmitter 290 as described above with reference to FIG. 2). In some embodiments, the action data can include information for the actor(s) during one or more period of times during the movie screening (e.g., corresponding to different scenes or events in the movie). For example, in one embodiment, the action data stream transmitted to the actor(s) is an audible script of instructions for action sequences for the actor(s) to perform (e.g., provide audible cues of how to move (e.g., "move to location (2,5)," "turn around," "run from (1, 6) to (2,0)"), be positioned ("kneel", "raise fist in the air facing the audience", "face the screen", "face actor at (3,6)"), interact with other actor(s) (e.g., "wave arms in argument with actor at (3,6)", "hug actor at (3,6)"), and/or interact with props during the movie screening (e.g., "enter phone booth at (0,6) and have a phone conversation")).

Figure 4B:
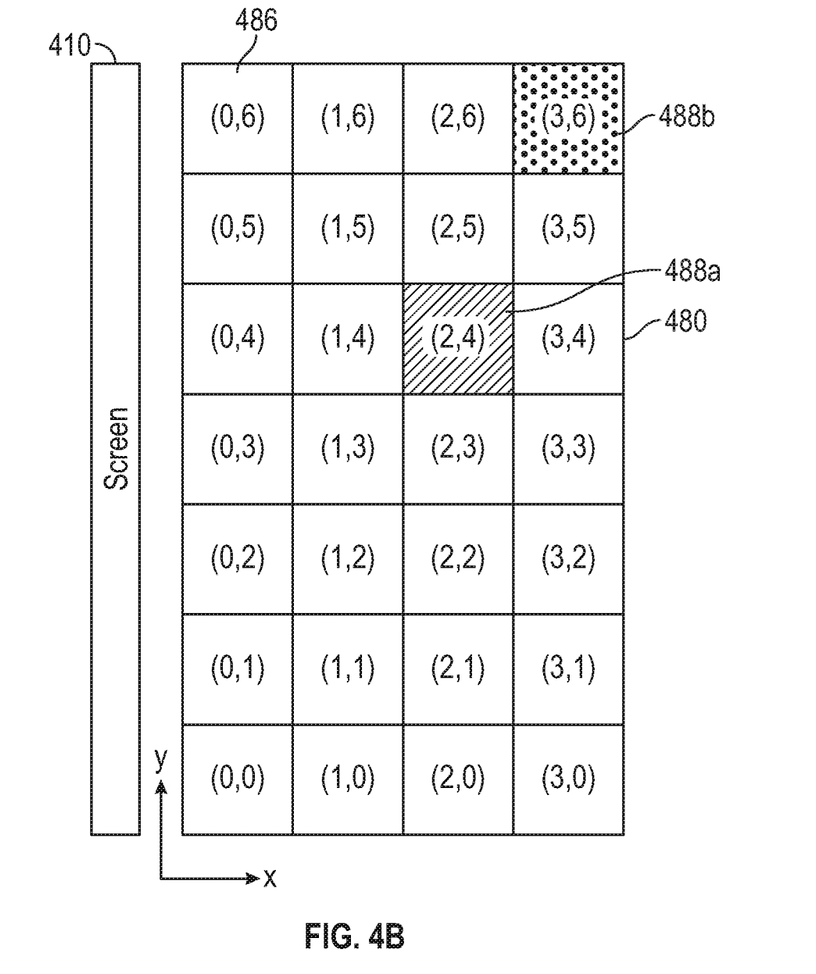
Figure 4C:
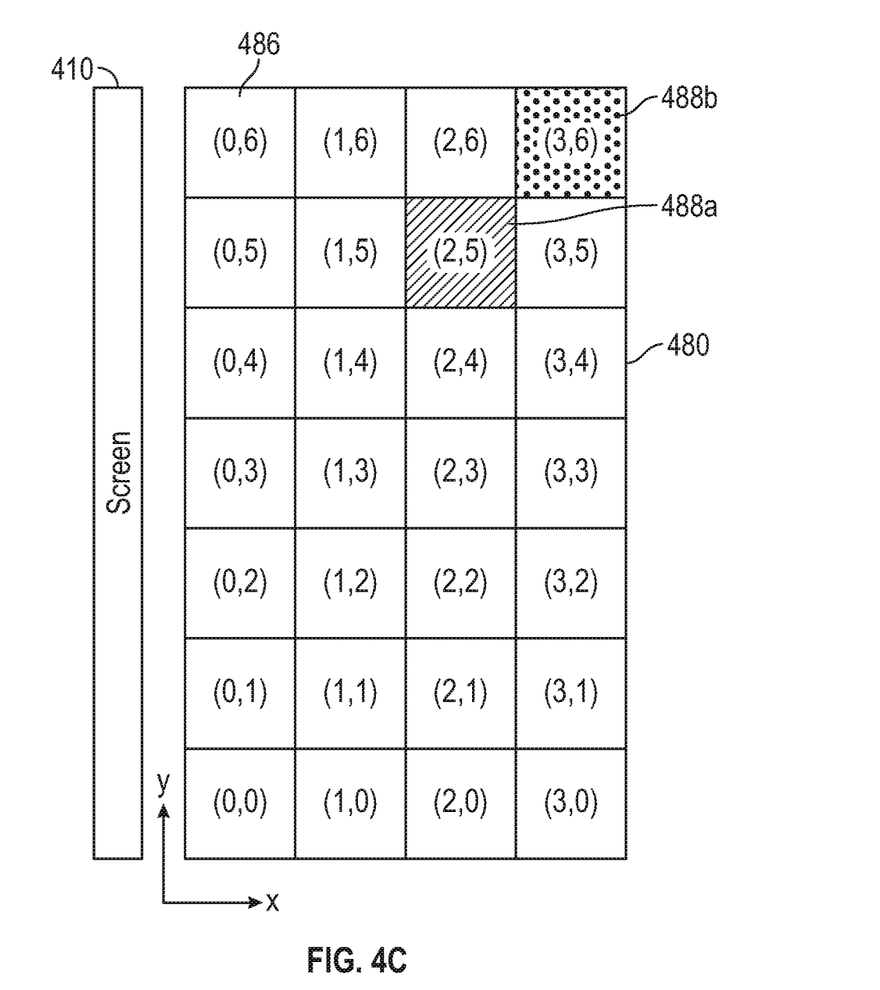
Figure 4D:
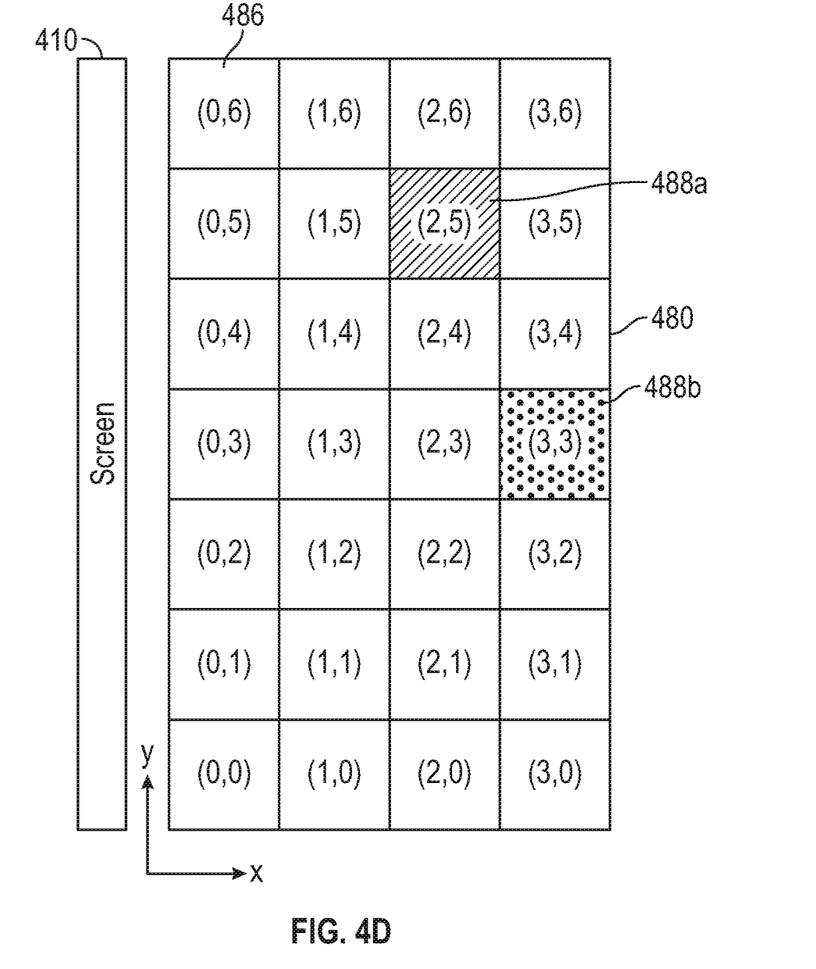

FIG. 4B illustrates stage 480 according to examples of the disclosure. In one embodiment, stage 480 is divided into grid of a plurality of locations 486. Each of locations 486 is optionally marked with an indication of the location (e.g., as described above with reference to FIG. 4A). In one embodiment, the surface of stage 480 is translucent and each of locations 486 can be configured with one or more lights sources (e.g., LED lights) underneath that translucent surface. The one or more lights sources under each of the locations 486 can illuminate one or more of a plurality of colors through the surface of stage 486 to indicate where the actor(s) should be positioned throughout the screening. In some embodiments, each actor can be assigned one light color to follow on stage 480 (e.g., a light color can be assigned to each actor identifier) during the screening. For example, actor A can be assigned color 488a and actor B can be assigned 488b which are illuminating locations (2,4) and (3,6), respectively, at a particular point in time during a screening, as shown in FIG. 4B. At a later point in time during the screening, location (2,4), for example, stops illuminating color 488a and location (2,5) begins illuminating color 488a while location (3,6) continues to illuminate color 488b, indicating that actor A should move from location (2,4) to location (2,5) and actor B should remain at location (3,6), as shown in FIG. 4C. At a later point in time during the screening, location (3,6), for example, stops illuminating color 488b and location (3,3) begins illuminating color 488b while location (2,5) continues to illuminate color 488a, indicating that actor B should move from location (3,6) to location (3,3) and actor A should remain at location (2,5), as shown in FIG. 4D. Notably, the transition for actor B from location (3,6) to location (3,3) is more than a unitary location (e.g., not a transition between adjacent locations), indicating that actor B move quickly (e.g., run) from location (3,6) to location (3,3).

In some embodiments, the instructions for how to illuminate one or more of locations 486 on stage 480 is contained in a positional data stream that is contained in the movie package (e.g., as described below with reference to FIGS. 5-7). This positional data stream can be extracted from the movie package (e.g., by player unit 220 as described above with reference to FIG. 2), synchronized to the movie screening (e.g., to the video and audio streams by player unit 220 as described above with reference to FIG. 2) and transmitted (e.g., by position transmitter 290 as described above with reference to FIG. 2) to one or more devices (e.g., as described above with reference to FIG. 3) for controlling the one or more light sources under stage 480. In some embodiments, the color assigned to each actor is included in the position data stream. In some embodiments, a color is assigned to each of the actors identified in the position data stream by the player unit 220 or by the one or more devices (e.g., as described above with reference to FIG. 3) for controlling the one or more light sources under stage 480. In some embodiments, the positional data stream and the action data stream(s) (e.g., as described above with reference to FIG. 4A) are both contained in the movie package. For example, an actor can receive both instructions from an action data stream through one or more in-ear devices (e.g., as described above with reference to FIG. 4A) and indications of what location on stage 480 to be on through one or more lights illuminating one or more locations (e.g., as described above with reference to FIGS. 4B-4D) during a screening.

Figure 5:
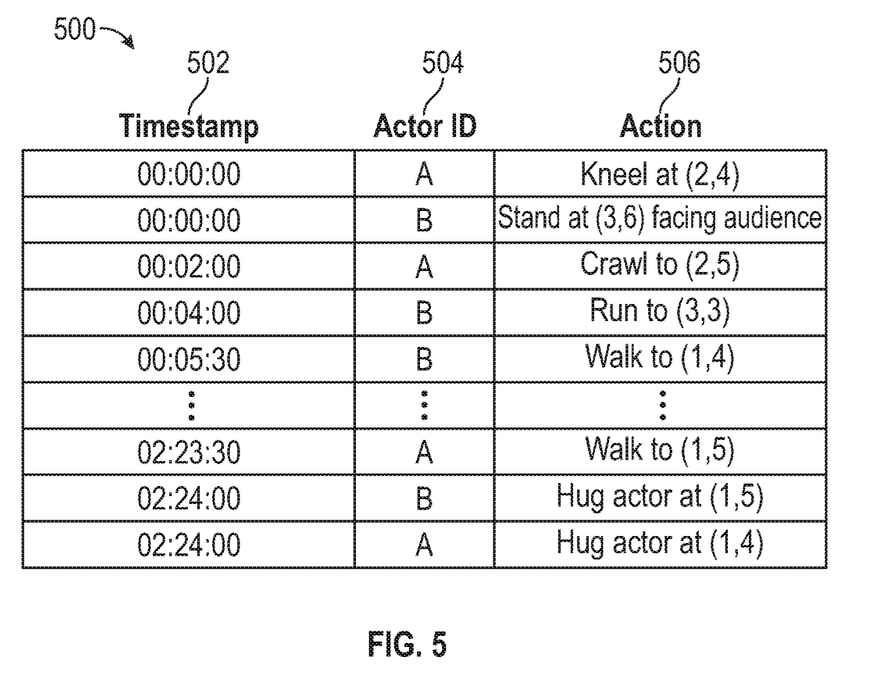
FIG. 5 illustrates action data streams according to examples of the disclosure.

FIG. 5 illustrates action data stream 500 according to examples of the disclosure. In one embodiment, action data stream 500 includes timestamp 502, actor identification (ID) 504, and action information 506, as shown in FIG. 5. In some embodiments, action information 506 indicates the action that the actor identified by the actor ID 504 should perform at time 502. In some embodiments, action information 506 includes instructions of how an actor should perform (e.g., move, be positioned, interact with other actor(s), and/or interact with props) during the movie screening (e.g., as described above with reference to FIG. 4A). In some embodiments, action information 506 is stored as text in action data stream 500 and is transmitted to one or more in-ear devices as an audible instruction (e.g., converted into an audible instruction by a receiving device (e.g., player unit 220 or position transmitter 290) (e.g., as described above with reference to FIG. 4A). In some embodiments, action information 506 is stored as an audio recording in action data stream 500 and is transmitted (e.g., routed) to one or more in-ear devices. In some examples, action data stream 500 can be serialized into individual audio tracks of instructions for a particular actor to perform (e.g., separate audio tracks for each actor) during a screening that is synchronized (e.g., as described above with reference to FIG. 2) with the movie's video and other audio streams (e.g., as described below with reference to FIG. 5-7). Each audible action data stream is either the same duration as the movie stream (e.g., the video and/or audio streams) or shorter than the duration of the movie stream. When each audible action data stream is shorter than the duration of the movie stream, each audible action data stream is synchronized with the beginning of the screening (e.g., transmission of the action data stream to the one or more in-ear devices is synchronized with the start of the presentation of the video and audio streams of the movie) but can terminate prior to the ending of the screening. In some embodiments, while the action data stream is synchronized with the start of the screening, the action data stream need not contain continues instructions from the beginning of the screening (e.g., the action data stream can contain moments of silence such that actors can be instructed to perform during one or more specific periods of time (e.g., scenes) of the movie screening).

Figure 6A:
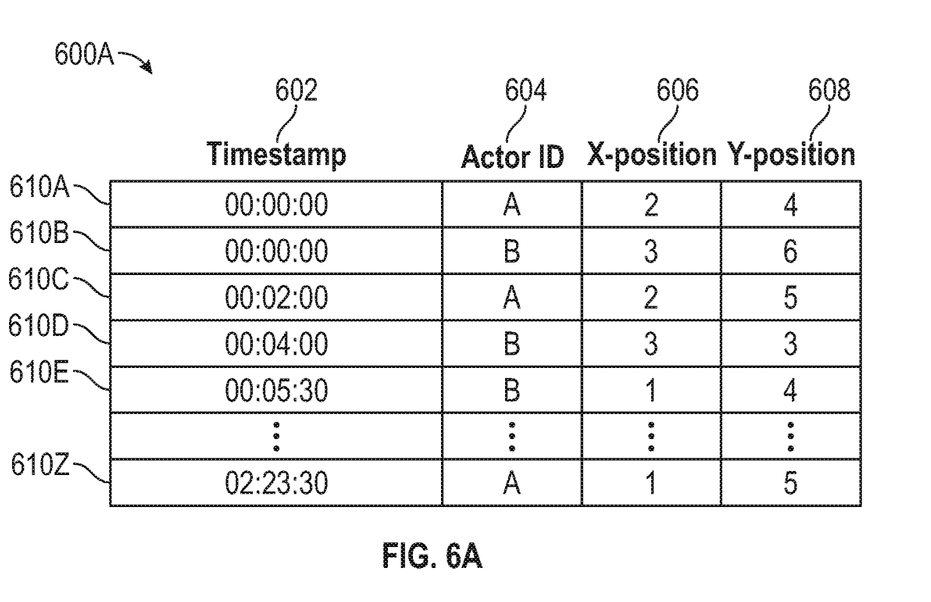
FIGS. 6A-6B illustrate positional data streams according to examples of the disclosure.
Figure 6B:
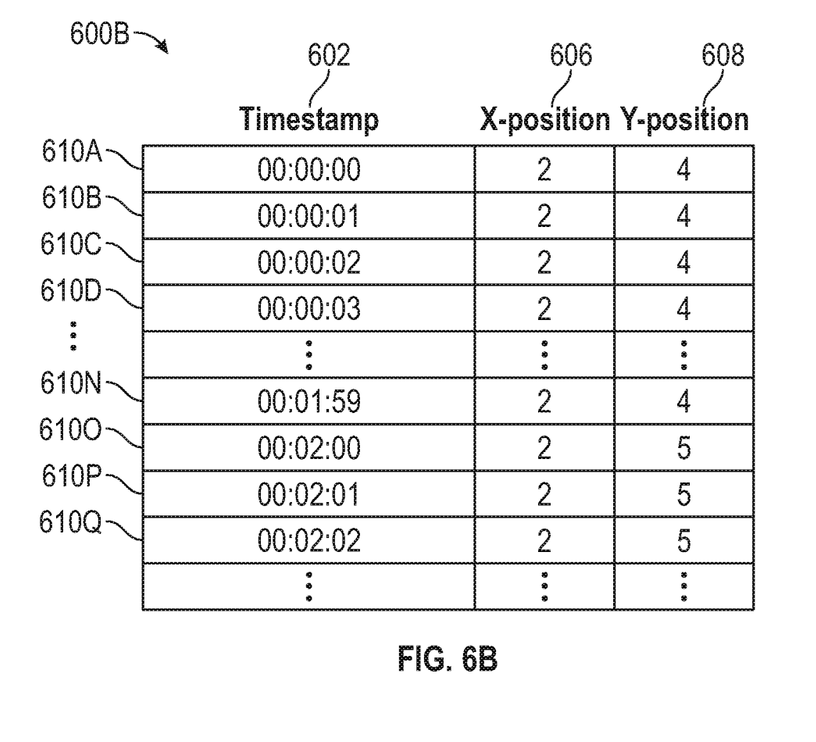

FIGS. 6A-6B illustrate positional data streams according to examples of the disclosure. In one embodiment, action data stream 600A includes timestamp 602, actor ID 604, X-position 606, and Y-position 608, as shown in FIG. 6A. In some embodiments, X-position 606 and Y-position 608 indicates the location (e.g., coordinates) on the stage the actor identified by the actor ID 604 should be located at time 602 (e.g., as described above with reference to FIGS. 4A-4D). In some embodiments, positional data stream 600A is extracted from the movie package (e.g., by player unit 220 as described above with reference to FIG. 2), converted into an audible instruction (e.g., by player unit 220 or position transmitter 290), and transmitted (e.g., by position transmitter 290) to one or more in-ear devices as an audio stream (e.g., as described above with reference to FIGS. 4A and 5). For example, entry 610A can be converted to the instruction "stand at (2,4)" (e.g., by player unit 220 or position transmitter 290) and transmitted (e.g., by position transmitter 290) to one or more in-ear devices corresponding to actor "A" (e.g., as described above with reference to FIGS. 4A and 5). In another example, entry 610C can be converted to the instruction "move to (2,5)" (e.g., by player unit 220 or position transmitter 290) and transmitted (e.g., by position transmitter 290) to one or more in-ear devices corresponding to actor "A" (e.g., as described above with reference to FIGS. 4A and 5).

In some embodiments, positional data stream 600A is extracted from the movie package (e.g., by player unit 220 as described above with reference to FIG. 2) and transmitted (e.g., by position transmitter 290) to one or more devices for controlling the one or more light sources under the stage according to the positional data stream 600A (e.g., as described above with reference to FIGS. 3, 4B-4D). For example, the one or more devices for controlling the one or more light sources will illuminate one or more lights under position (2,4) of the stage with a first color (e.g., corresponding to actor "A") and illuminate one or more light sources under position (3,6) of the stage with a second color (e.g., a different color than the first color, corresponding to actor "B") at time "00:00:00" according to instructions 610A and 610B, respectively. At time "00:02:00" the one or more devices for controlling the one or more light sources will stop illuminating the one or more lights under position (2,4) of the stage and illuminate one or more lights under position (2,5) of the stage with the first color (e.g., corresponding to actor "A") while continuing to illuminate the one or more lights under position (3,6) of the stage with the second color (e.g., corresponding to actor "B") according to instruction 610C (e.g., the one or more lights under a particular position will not stop illuminating until the one or more devices for controlling the one or more light sources under the stage receive an instruction to illuminate another position with the same color). In some embodiments, the color assigned to each actor ID 604 is included in the position data stream 600A. In some embodiments, a color is assigned to each of the actors ID 604 identified in the position data stream 600A by the player unit 220 or by the one or more devices for controlling the one or more light sources under the stage.

In some embodiments, positional data stream 600A can be serialized into individual data tracks for each actor to perform, as shown in FIG. 6B as positional data stream 600B. Serialized data stream 600B can inform the one or more devices for controlling one or more light sources under the stage as to which location(s) should be illuminated at every moment during the screening (e.g., with instructions of what position(s) should be illuminated at every second of the screening). Each positional data stream 600B is either the same duration as the movie stream (e.g., the video and/or audio streams) or shorter than the duration of the movie stream. When each positional data stream 600B is shorter than the duration of the movie stream, each positional data stream 600B is synchronized with the beginning of the screening (e.g., transmission of the positional data stream 600B to the one or more devices for controlling the one or more light sources under the stage are synchronized with the start of the presentation of the video and audio streams of the movie) but can terminate prior to the ending of the screening. It should be noted that each positional data stream 600B need not always require a particular position to be illuminated. In this way, an actor associated with a particular color or positional data stream 600B need not be on stage at every moment during the screening (e.g., the one or more devices for controlling the one or more light sources under the stage, in some examples, only illuminate one or more positions during one or more periods of time (e.g., scenes) of the movie screening). In some embodiments, the color assigned to each actor ID 604 is included in the position data stream 600B.

Figure 7:
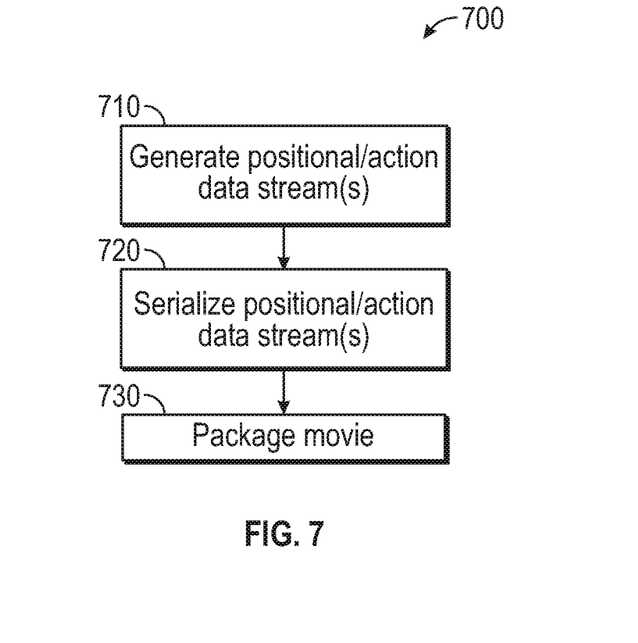
FIG. 7 illustrates a process for incorporating actor positional and/or action data into a movie package according to examples of the disclosure.

FIG. 7 illustrates a process 700 for incorporating actor positional and/or action data into a movie package according to examples of the disclosure. At step 710, actor positional and/or action data streams (e.g., as described above with reference to FIGS. 4-6) are generated. For example, a director, choreographer, or other person decides how one or more actors will perform during the screening (e.g., move, be positioned, interact with other actor(s), and/or interact with props) during the movie screening (e.g., as described above with reference to FIGS. 2, 4A-4D, and 5)) and records this positional (e.g., X and Y coordinates on the stage) and/or action (e.g., actor position, movement, gesture(s), etc.) information (e.g., by actor and timestamp as described above with reference to FIGS. 5 and 6A-6B). In some embodiments, audio action instructions in the action data stream(s) is also recorded (e.g., as described above with reference to FIGS. 4B-4D and 5), at step 710. In some embodiments, at step 710, distinct colors are assigned to individual actors (e.g., to distinct actor IDs) and recorded into the actor positional and/or action data streams. At step 720, the one or more positional and/or action data is serialized to form continuous stream(s) of positional and/or actions data (e.g., as described above with reference to FIGS. 5 and 6B).

At step 730, the actor positional and/or action data streams are incorporated into a movie package (e.g., into a DCP or other DCI compliant standard). In some embodiments, actor positional and/or action data streams are packaged inside Material Exchange Format (MXF) files with each file matching the timeline of one video "reel" (e.g., as defined in the DCP standard). In some embodiments, these MXF files corresponding to the actor positional and/or action data streams are encrypted (e.g., using AES encryption). These MXF files are then packaged inside a DCP (e.g., with audio, video, subtitle, and other data files required for movie playback). In some embodiments, the MXF files corresponding to the actor positional and/or action data streams are referenced inside the Composition Playlist (CPL) as auxiliary tracks for each reel they belong to. If these the MXF files corresponding to the actor positional and/or action data streams are encrypted, they keys for decryption are carried inside a KDM for the DCP, similar to the keys for other audio, video, subtitle, and/or other dates files for a movie package.

Thus, the examples of the disclosure provide various ways to implement augmented reality movie screenings at cinema theaters.

Therefore, according to the above, some examples of the disclosure are directed to a method for a augmented reality screening comprising: receiving a content package; extracting actor, video, and audio data from the content package; displaying the extracted video data on a display; playing the extracted audio data on one or more speakers; and instructing one or more actors to perform one or more actions on a stage based on the extracted actor data. Additionally or alternatively to one or more of the examples disclosed above, in some examples, the stage is divided into a grid comprising a plurality of distinct locations. Additionally or alternatively to one or more of the examples disclosed above, in some examples, the plurality of distinct locations on the stage are marked with a plurality of indications; and the actor data comprises a plurality instructions indicating in which of the plurality of distinct locations each of the one or more actors should be located during one or more periods of time of the augmented reality screening. Additionally or alternatively to one or more of the examples disclosed above, in some examples, instructing the one or more actors to perform the one or more actions on the stage based on the extracted actor data comprises transmitting first instructions of the plurality of instructions to a first in-ear device corresponding to a first actor of the one or more actors and transmitting second instructions of the plurality of instructions to a second in-ear device corresponding to a second actor of the one or more actors. Additionally or alternatively to one or more of the examples disclosed above, in some examples, the stage comprises a translucent surface with one or more light sources configured under each of the plurality of distinct locations, wherein each of the one or more light sources are capable of illuminating a plurality of distinct colors through the translucent surface of the stage. Additionally or alternatively to one or more of the examples disclosed above, in some examples, instructing the one or more actors to perform the one or more actions on the stage based on the extracted actor data comprises: illuminating a first light source of the one or more light sources corresponding to a first location of the plurality of distinct locations in a first color of the plurality of distinct colors during a first period of time to instruct a first actor of the one or more actors to be positioned at the first location during the first period of time; and illuminating a second light source of the one or more light sources corresponding to a second location of the plurality of distinct locations in first color of the plurality of distinct colors during a second period of time to indicate that the first actor of the one or more actors be positioned at the second location during the second period of time. Additionally or alternatively to one or more of the examples disclosed above, in some examples, the second location of the plurality of distinct locations is different than the first location of the plurality of distinct locations, indicating that the first actor move to the second location at the second period of time; and the second period of time is after the first period of time. Additionally or alternatively to one or more of the examples disclosed above, in some examples, instructing the one or more actors to perform the one or more actions on the stage based on the extracted actor data further comprises: illuminating a third light source of the one or more light sources corresponding to a third location of the plurality of distinct locations in a second color of the plurality of distinct colors, different than the first color of the plurality of distinct colors, during the first period of time to instruct a second actor of the one or more actors, different than the first actor of the one or more actors, to be positioned at the third location during the first period of time; and continuing to illuminate the third light source of the one or more light sources corresponding to the third location of the plurality of distinct locations in the second color of the plurality of distinct colors during the first period of time to indicate that the second actor of the one or more actors be positioned at the second location during the second period of time. Additionally or alternatively to one or more of the examples disclosed above, in some examples, the one or more actions comprises one of posing, moving, and interacting with one or more other actors or props. Additionally or alternatively to one or more of the examples disclosed above, in some examples, the content package is a Digital Cinema Package (DCP).

Some examples of the disclosure are directed to a system for a augmented reality screening comprising: a player unit for receiving a content package and extracting actor position, video, and audio data from the content package; a display for displaying the extracted video data, wherein the display is an emissive display; one or more speakers for playing the extracted audio data; a stage configured in front of the display, wherein the stage is divided into a grid comprising a plurality of distinct locations; and a position transmitter for transmitting the extracted actor position data, wherein the actor position data includes actions for the one or more actors to perform on the stage. Additionally or alternatively to one or more of the examples disclosed above, in some examples, the plurality of distinct locations on the stage are marked with a plurality of indications; and the actor data comprises a plurality of instructions indicating in which of the plurality of distinct locations each of the one or more actors should be located during one or more periods of time of the augmented reality screening. Additionally or alternatively to one or more of the examples disclosed above, in some examples, transmitting the extracted actor position data comprises transmitting first instructions of the plurality of instructions to a first in-ear device corresponding to a first actor of the one or more actors and transmitting second instructions of the plurality of instructions to a second in-ear device corresponding to a second actor of the one or more actors. Additionally or alternatively to one or more of the examples disclosed above, in some examples, the stage comprises a translucent surface with one or more light sources configured under each of the plurality of distinct locations, wherein each of the one or more light sources are capable of illuminating a plurality of distinct colors through the translucent surface of the stage. Additionally or alternatively to one or more of the examples disclosed above, in some examples, transmitting the extracted actor position data comprises: illuminating a first light source of the one or more light sources corresponding to a first location of the plurality of distinct locations in a first color of the plurality of distinct colors during a first period of time to instruct a first actor of the one or more actors to be positioned at the first location during the first period of time; and illuminating a second light source of the one or more light sources corresponding to a second location of the plurality of distinct locations in first color of the plurality of distinct colors during a second period of time to indicate that the first actor of the one or more actors be positioned at the second location during the second period of time.

Some examples of the disclosure are directed to system for a augmented reality screening comprising: means for receiving a content package and for extracting actor, video, and audio data from the content package; display means for displaying the extracted video data; means for playing the extracted audio data; stage means for one or more actors to perform one or more actions on, wherein the stage means is configured in front of the display means and the stage means is divided into a grid comprising a plurality of distinct locations; and means for transmitting the extracted actor position data, wherein the actor position data includes the actions for the one or more actors to perform on the stage means. Additionally or alternatively to one or more of the examples disclosed above, in some examples, the plurality of distinct locations on the stage means are marked with a plurality of indications; and the actor data comprises a plurality of instructions indicating in which of the plurality of distinct locations each of the one or more actors should be located during one or more periods of time of the augmented reality screening. Additionally or alternatively to one or more of the examples disclosed above, in some examples, transmitting the extracted actor position data comprises transmitting first instructions of the plurality of instructions to a first in-ear device corresponding to a first actor of the one or more actors and transmitting second instructions of the plurality of instructions to a second in-ear device corresponding to a second actor of the one or more actors. Additionally or alternatively to one or more of the examples disclosed above, in some examples, the stage means comprises a translucent surface with one or more light sources configured under each of the plurality of distinct locations, wherein each of the one or more light sources are capable of illuminating a plurality of distinct colors through the translucent surface of the stage. Additionally or alternatively to one or more of the examples disclosed above, in some examples, transmitting the extracted actor position data comprises: illuminating a first light source of the one or more light sources corresponding to a first location of the plurality of distinct locations in a first color of the plurality of distinct colors during a first period of time to instruct a first actor of the one or more actors to be positioned at the first location during the first period of time; and illuminating a second light source of the one or more light sources corresponding to a second location of the plurality of distinct locations in first color of the plurality of distinct colors during a second period of time to indicate that the first actor of the one or more actors be positioned at the second location during the second period of time.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method for an augmented reality screening performance at a designated area of performance having a stage, wherein the stage comprises a translucent surface with a plurality of light sources configured thereunder, a display locate behind the stage with respect to an audience, wherein said display is one of an emissive, transmissive, or transflective display, and at least one speaker, said method comprising the steps of:
   receiving, at a control center, a Digital Cinema Package (DCP);
   extracting, from the received DCP, actor data, video data, and audio data;
   displaying the extracted video data on the display that is located behind the stage;
   playing the extracted audio data on the at least one speaker;
   designating a plurality of distinct locations on the stage by illuminating the one or more light sources configured under the translucent surface of the stage, said designation is in accordance with instructions contained in the extracted actor data, wherein the extracted actor data comprises a plurality of instructions indicating in which of the plurality of distinct locations each of a one or more correspondingly designated actors should be located during one or more periods of time of the augmented reality screening; and
   transmitting, to one or more in-ear device of one or more actors, instructions from the extracted actor data for instructing said one or more actors to perform one or more actions on a stage at one or more of said plurality of locations,
   wherein the audio, video, and actor data are of the same runtime length and are synchronized during the performance.

2. The method of claim 1, instructing the one or more actors to perform the one or more actions on the stage based on the extracted actor data comprises:
   illuminating a first light source of the one or more light sources corresponding to a first location of the plurality of distinct locations in a first color of the plurality of distinct colors during a first period of time to instruct a first actor of the one or more actors to be positioned at the first location during the first period of time; and
   illuminating a second light source of the one or more light sources corresponding to a second location of the plurality of distinct locations in first color of the plurality of distinct colors during a second period of time to indicate that the first actor of the one or more actors be positioned at the second location during the second period of time.

3. The method of claim 2, wherein:
   the second location of the plurality of distinct locations is different than the first location of the plurality of distinct locations, indicating that the first actor move to the second location at the second period of time; and
   the second period of time is after the first period of time.

4. The method of claim 2, wherein instructing the one or more actors to perform the one or more actions on the stage based on the extracted actor data further comprises:
   illuminating a third light source of the one or more light sources corresponding to a third location of the plurality of distinct locations in a second color of the plurality of distinct colors, different than the first color of the plurality of distinct colors, during the first period of time to instruct a second actor of the one or more actors, different than the first actor of the one or more actors, to be positioned at the third location during the first period of time; and
   continuing to illuminate the third light source of the one or more light sources corresponding to the third location of the plurality of distinct locations in the second color of the plurality of distinct colors during the first period of time to indicate that the second actor of the one or more actors be positioned at the second location during the second period of time.

5. The method of claim 1, wherein the one or more actions comprises one of posing, moving, and interacting with one or more other actors or props.

6. The method of claim 1, wherein the content package is a Digital Cinema Package (DCP).

7. A system for an augmented reality screening at a designated area of performance comprising:
- a stage, wherein the stage comprises a translucent surface with a plurality of light sources configured thereunder,
- a display located behind the stage with respect to an audience, wherein said display is one of an emissive, transmissive, or transflective display,
- at least one speaker;
- a player unit for receiving a Digital Cinema Package (DCP) and extracting, from the DCP, actor position data, video data, and audio data;
- a display controller for controlling the display to playback the extracted video data;
- an audio playback controller for playback of the extracted audio data via said at least one speaker;
- a stage controller for designating a plurality of distinct locations on the stage by causing the illumination the one or more light sources configured under the translucent surface of the stage, said designation is in accordance with instructions contained in the extracted actor data, wherein the extracted actor data comprises a plurality of instructions indicating in which of the plurality of distinct locations each of a one or more correspondingly designated actors should be located during one or more periods of time of the augmented reality screening;
- a communication device for transmitting, to one or more in-ear device of the one or more actors, instructions from the extracted actor data for instructing said one or more actors to perform one or more actions on a stage at one or more of said plurality of designated locations,
- wherein the audio, video, and actor data are of the same runtime length and are synchronized during the performance.

8. The system of claim 7, wherein the extracted actor position data comprises:
- information for illuminating a first light source of the one or more light sources corresponding to a first location of the plurality of distinct locations in a first color of the plurality of distinct colors during a first period of time to instruct a first actor of the one or more actors to be positioned at the first location during the first period of time; and
- information for illuminating a second light source of the one or more light sources corresponding to a second location of the plurality of distinct locations in first color of the plurality of distinct colors during a second period of time to indicate that the first actor of the one or more actors be positioned at the second location during the second period of time.

9. A system for an augmented reality screening at a designated area of performance comprising:
- a stage, wherein the stage comprises a translucent surface with a plurality of light sources configured thereunder,
- a display located behind the stage with respect to an audience, wherein said display is one of an emissive, transmissive, or transflective display,
- at least one speaker;
- means for receiving a Digital Cinema Package (DCP) and extracting, from the DCP, actor position data, video data, and audio data;
- means for controlling the display to playback the extracted video data;
- means for playback of the extracted audio data via said at least one speaker;
- means for designating a plurality of distinct locations on the stage by causing the illumination the one or more light sources configured under the translucent surface of the stage, said designation is in accordance with instructions contained in the extracted actor data, wherein the extracted actor data comprises a plurality of instructions indicating in which of the plurality of distinct locations each of a one or more correspondingly designated actors should be located during one or more periods of time of the augmented reality screening;
- means for transmitting, to one or more in-ear device of the one or more actors, instructions from the extracted actor data for instructing said one or more actors to perform one or more actions on a stage at one or more of said plurality of designated locations,
- wherein the audio, video, and actor data are of the same runtime length and are synchronized during the performance.

10. The system of claim 9, wherein the extracted actor position data comprises:
- information for illuminating a first light source of the one or more light sources corresponding to a first location of the plurality of distinct locations in a first color of the plurality of distinct colors during a first period of time to instruct a first actor of the one or more actors to be positioned at the first location during the first period of time; and
- information for illuminating a second light source of the one or more light sources corresponding to a second location of the plurality of distinct locations in first color of the plurality of distinct colors during a second period of time to indicate that the first actor of the one or more actors be positioned at the second location during the second period of time.

* * * * *